United States Patent
Corley

Patent Number: 5,850,256
Date of Patent: Dec. 15, 1998

[54] PORTABLE TEST PATTERN ILLUMINATOR

[76] Inventor: Ferrand David Corley, 80 Kleins Crescent, Kleinburg, Ontario, Canada, L0J 1C0

[21] Appl. No.: 574,420

[22] Filed: Dec. 15, 1995

[51] Int. Cl.$^6$ ........................................... H04N 17/00
[52] U.S. Cl. .................... 348/187; 359/599; 396/4; 396/5
[58] Field of Search ................... 348/180, 187, 348/188, 189, 191, 181, 722; 359/599, 452, 453, 460; 396/4, 5; H04N 17/00

[56] References Cited

U.S. PATENT DOCUMENTS

| | | | |
|---|---|---|---|
| 4,170,025 | 10/1979 | Benkley et al. | 348/188 |
| 4,264,168 | 4/1981 | Baliozian | 396/5 |
| 4,384,769 | 5/1983 | Brei et al. | 348/188 |
| 4,779,136 | 10/1988 | Corley | 348/188 |
| 5,243,402 | 9/1993 | Weber et al. | 359/599 |
| 5,371,538 | 12/1994 | Widger | 348/188 |
| 5,604,550 | 2/1997 | White | 396/4 |

*Primary Examiner*—John K. Peng
*Assistant Examiner*—Jeffrey S. Murrell
*Attorney, Agent, or Firm*—Dowell & Dowell, P.C.

[57] ABSTRACT

This invention relates to an improvement in a portable test pattern illuminator for illuminating a reference image so that the color and tonal range of a camera focussed on the reference image can be balanced to enable the camera to produce a faithful reproduction of objects in a light source having similar characteristics of the general type having a screen with an opening; means for supporting a reference image object in said opening; and a light diffuser panel for transmitting light from a source to the reference object. The improvement consists wherein the reference object is supported by the means for supporting the reference object in parallel relation to the surface of the light diffuser panel. Yet a further improvement comprises providing a diffuser panel which has a peripheral non-specular reflector extending around its perimeter; said peripheral non-specular reflector having a non-specular reflective surface of substantially neutral coloration to reflect non-specular diffused light onto the marginal areas of the diffuser panel to achieve a more even light distribution across the face of the diffuser panel in use. Yet a further improvement comprises mounting a specular reflector at the back of the screen to reflect light from a source to the diffuser panel's surface, the plane of said specular reflector being at an angle of about 45 degrees to the plane of the screen, whereby the length of the light path from the source to the diffuser panel's surface is about the same for the full depth of the diffuser panel's surface.

4 Claims, 4 Drawing Sheets

PORTABLE TEST PATTERN ILLUMINATOR

This invention relates to a portable test pattern illuminator for illuminating a reference image so that the color and tonal range of a camera focussed on the reference image can be balanced to enable the camera to produce a faithful reproduction of objects in a light source having similar characteristics

BACKGROUND OF THE INVENTION

Portable test pattern illuminators designed to illuminate a reference image plate with a particular light so that the color camera or the like can be color and tonal balanced for a particular light have been generally used for many years. The illuminator described in my U.S. Pat. No. 4,779,136 dated Oct. 18, 1988 for an invention entitled Camera Alignment Device is such a device that has been commercially successful. Eight years of experience selling and servicing that illuminator, however, have revealed certain shortcomings and it is a purpose of this invention to address those shortcomings and provide an illuminator with which one can more accurately color-align a camera to a specific light source, and that in addition is more compact, easier to use, and more economical to make.

BRIEF SUMMARY OF THE INVENTION

According to one aspect of the present invention, there is provided, in a portable test pattern illuminator for illuminating a reference image so that the color and tonal range of a camera focussed on the reference image can be balanced to enable the camera to produce a faithful reproduction of objects in a light source having similar characteristics, having: a screen with an opening; a means for supporting a reference image object in said opening; and a light diffuser panel for transmitting light from a source to the reference object, the improvement:
   wherein the reference object is supported by the means for supporting the reference object in parallel relation to the surface of the light diffuser panel and;
   wherein said diffuser panel has a peripheral non-specular reflector extending around its perimeter; said peripheral non-specular reflector having a non-specular reflective surface of substantially neutral coloration to reflect non-specular diffused light onto the marginal areas of the diffuser panel to achieve a more even light distribution across the face of the diffuser panel in use.

According to another aspect of the present invention, there is provided in a portable test pattern illuminator for illuminating a reference image so that the color and tonal range of a camera focussed on the reference image can be balanced to enable the camera to produce a faithful reproduction of objects in a light source having similar characteristics, having: a screen with an opening; means for supporting a reference image object in said opening; and a light diffuser panel for transmitting light from a source to the reference object; the improvement:
   wherein the reference object is supported by the means for supporting the reference object in parallel relation to the surface of the light diffuser panel and;
   a specular reflector is mounted at the back of the screen to reflect light from a source to the diffuser panel's surface, the plane of said specular reflector being at an angle of about 45 degrees to the plane of the screen, whereby the length of the light path from the source to the diffuser panel's surface is about the same for the full depth of the diffuser panel's surface.

Other aspects of the invention will be apparent after reading the following detailed description in conjunction with the drawings:

IN THE DRAWINGS

DESCRIPTION OF A SPECIFIC EMBODIMENT

Figure 1:
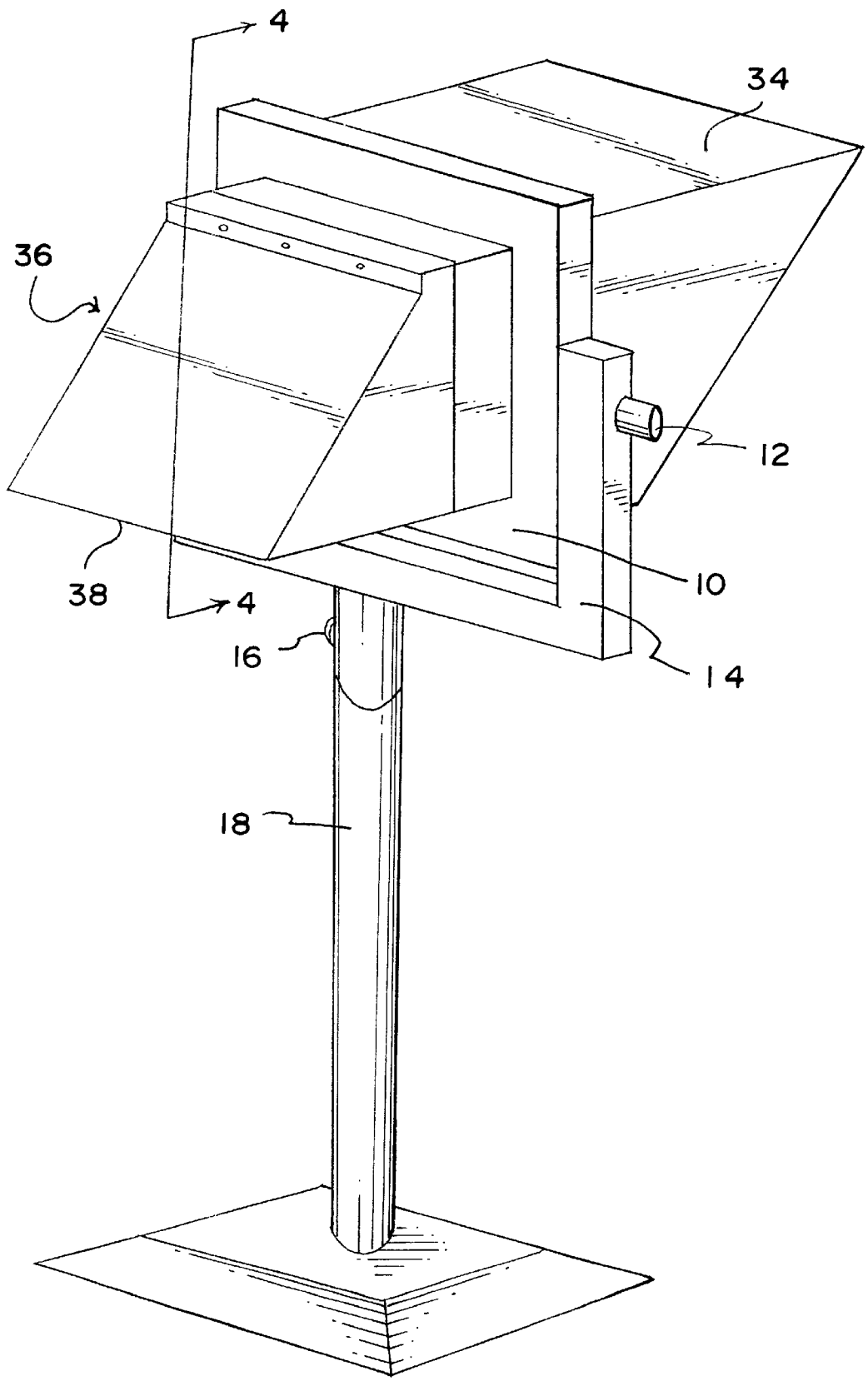
FIG. 1 is a schematic perspective illustration of an embodiment of the invention from the back with the specular reflector in place.

Referring to the drawings, the test pattern illuminator there shown has an opaque screen 10 of any suitable material such as wood mounted in a yolk 14 for rotation about a horizontal axis as at 12. The yoke 14 is in turn mounted for rotation about a vertical axis and for telescopic adjustment as at 16 in a base 18. This general mounting arrangement for supporting the screen in different orientations is generally used in the trade. The invention does not involve the support of the screen and any workable means of support can be used for the invention.

The invention concerns the manner in which the reference image 20 is illuminated in the screen opening 22. Numeral 22 refers to a rectangular through-opening in the screen 10. The reference image is a transparent plate, the upper and lower edges of which are slid into channels 26 on the upper and lower margins of the opening 22 to support the reference image in the opening.

Reference image 20 is typically a transparent rigid plate of glass or plastic on which are mounted pieces of photographic material such as bars of specimen color or density as reference images.

Figure 2:
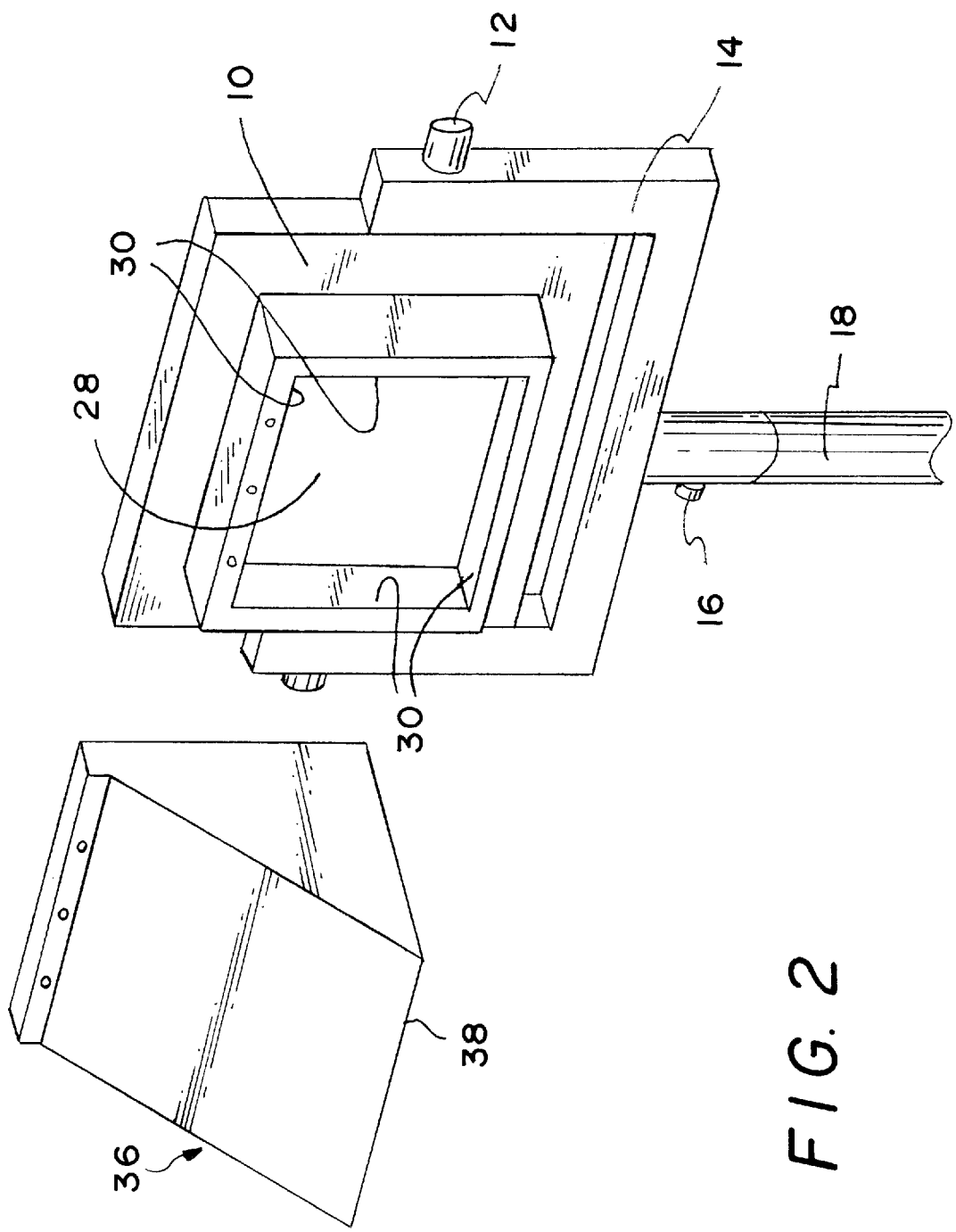
FIG. 2 is a schematic perspective partial illustration of the device of FIG. 1 from the back with the spectral reflector removes and showing the peripheral non-specular reflector that extends around the diffuser panel.
Figure 3:
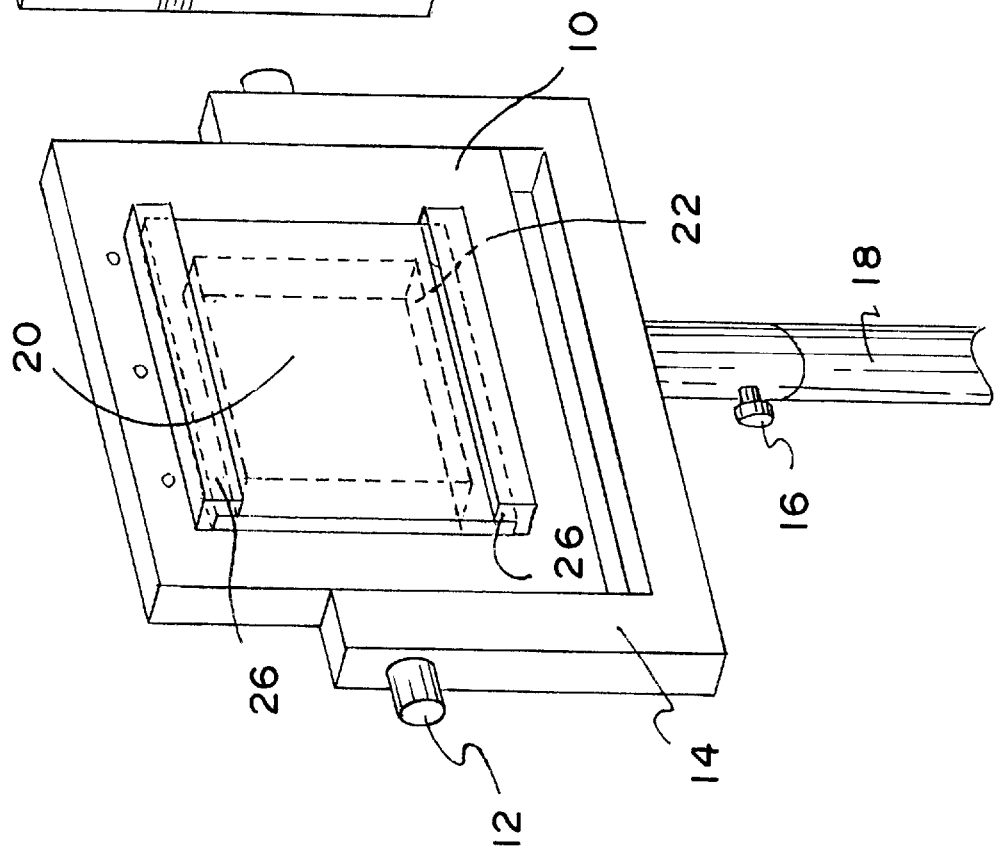
FIG. 3 is a sectional illustration in a vertical plane illustrating the operation of the non-specular reflector.

It is important that the reference image 20 be uniformly illuminated over its full extent for the most reliable alignment of a camera. Illumination is achieved by directing light through the light diffuser panel 28 mounted to the back side of the screen 10 to cover the opening 22 as seen in FIGS. 2 and 3. Diffuser panel 28 is made of a translucent material, typically a milky white form of acrylic plastics sheet of neutral color characteristics that will pass and diffuse light.

It will be noted that the reference image plate 20 is in parallel relation to the diffuser panel 28 so that the light path between diffuser panel and reference image card is constant over the whole face of the reference panel. This is important in achieving even illumination across the reference image plate.

In the illuminator of U.S. Pat. No. 4,779,136 the test light passes through a diffuser panel (34 on the drawings of the patent) that is inclined with respect to the plane of the reference image and there is a difference in the distance that light travels from the diffuser panel to the reference image over the face of the image. In some cases the diffuser panel in use is at an angle of as much as 45 degrees to the reference image and it has been found that these larger angles can result in inaccuracies in alignment of a camera. It has also been found that by mounting the reference piece 20 parallel to the diffuser, these inaccuracies can be eliminated.

Numeral 30 refers to a peripheral non specular reflector extending around the diffuser panel 28 that is designed to reflect diffused light onto the marginal areas of the diffuser panel 28. It has been found that if the diffuser panel is illuminated only with direct light from the light source the marginal areas of the panel often have between 5 and 20 percent less light than the more central portions. This is especially so if the light source that is used for illumination is close to the diffuser panel. I have found that this difference can be reduced to about 2% in most cases by providing peripheral non-specular reflectors for the edges of the diffuser panel to reflect diffused light on the marginal areas of the panel to supplement the direct light.

A peripheral non-specular reflector having a white matte finish and a depth of about two inches reflects sufficient light to the marginal areas of the diffuser panel to reduce the deficiency of light at the marginal areas to about 2% for most light sources. To be avoided in the peripheral reflectors is a mirror reflection that would show the line of the edge of the reflector on the diffuser surface. With mirror reflection, light leaves the mirror surface at an angle equal to the angle of incidence and is said to be specular. The reflected light from the peripheral reflectors 30 should be substantially non specular i.e. diffused.

In a typical use, it is desired to align a color camera with an artificial light source. The standard color matching reference image plate 20 is slid into the slots 26 to mount it in the opening 22 of the screen 10. The spectral reflector assembly is removed and the camera is then directed at the diffuser plate 20. The light source is directed to the diffuser panel 28 to illuminate the reference image through the diffuser panel. The camera is color aligned with the image plate 20 in the usual way Hood 34 is mounted over the reference image as illustrated to shield the image from ambient light.

Figure 4:
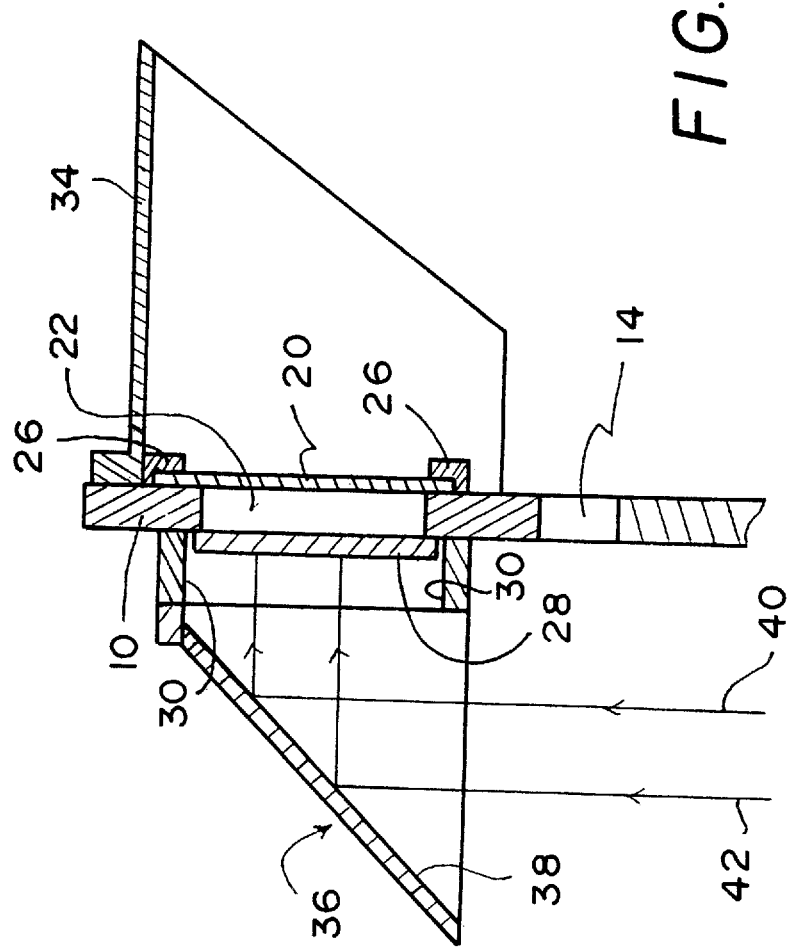
FIG. 4 is a schematic sectional view along a line similar to 3–3 showing the use of a specular reflector.

In some uses, it may be desired to reflect the test source light to the diffuser screen and this invention provides a simple reflector assembly generally referred to by the numeral 36 that can be mounted by any convenient mechanical means on the back side of the screen to do this as schematically illustrated in FIGS. 1 and 3. This reflector assembly has a mirror 38 that reflects light from a light source to the diffuser panel 28. It will be noted that the plane of the mirror surface is at an angle of 45 degrees to the plane of the diffuser panel so that the length of all light paths to the screen is the same. Light path 40 for example in FIG. 4 has a long direct path and a short reflected path and light path 42 has a shorter direct path and a longer reflected path. But if the reflector angle is about 45 degrees, the sum of the direct and reflected paths is substantially the same in these and all cases and this is the condition that gives the most even light distribution over the full face of the reference image plate 20. Reflector 38 is a mirror or specular reflector panel. The important aspect is that the inclination of the mirror be about 45 degrees so that the light paths are about the same in length.

I have found that there is a variation of illumination across the reference image if the length of the light paths from source to diffusion plate varies and that by keeping the reflector plate 38 at an angle of about 45 degrees to the plane of the diffuser plate I can keep the light path lengths the same and get the best uniformity of illumination.

It will be apparent that the construction of the invention is less complex than the prior art. Entirely eliminated is the cumbersome diffuser plate of my former patent that had to be both rotatably and hingedly mounted with respect to the screen. Not only has it been eliminated but the evenness of the diffuser plate illumination has been improved. The peripheral non-specular reflector substantially improves uniformity of illumination of the reference plate as explained above. The 45 degree mounted specular reflector increases the utility of the device and maintains uniformity of illumination across the screen. The invention can be manufactured for less money in a more portable and convenient form for use.

Embodiments of the invention other than the one illustrated will be apparent to those skilled in the art and it is not intended the foregoing specification should be read in a limiting sense.

The embodiments of the invention in which an exclusive property or privilege is claimed are defined as follows:

1. In a portable test pattern illuminator for illuminating a reference image so that the color and tonal range of a camera focussed on the reference image can be balanced to enable the camera to produce a faithful reproduction of objects in a light source having similar characteristics, having a screen with an opening;

means for supporting a reference image object in said opening; and a light diffuser panel for transmitting light from a source to the reference object, the improvement:

wherein the reference object is supported by the means for supporting the reference object in parallel relation to the surface of the light diffuser panel and;

wherein said diffuser panel has a peripheral non-specular reflector extending around its perimeter; said peripheral non-specular reflector having a non-specular reflective surface of substantially neutral coloration to reflect non-specular diffused light onto the marginal areas of the diffuser panel to achieve a more even light distribution across the face of the diffuser panel in use.

2. In a portable test pattern illuminator for illuminating a reference image so that the color and tonal range of a camera focussed on the reference image can be balanced to enable the camera to produce a faithful reproduction of objects in a light source having similar characteristics, having a screen with an opening;

means for supporting a reference image object in said opening; and a light diffuser panel for transmitting light from a source to the reference object;

the improvement as claimed in claim 1 and having a specular reflector mounted at the back of the screen to reflect light from a source to the diffuser panel's surface, the plane of said specular reflector being at an angle of about 45 degrees to the plane of the screen, whereby the length of the light path from the source to the diffuser panel's surface is about the same for the full depth of the diffuser panel's surface.

3. In a portable test pattern illuminator for illuminating a reference image so that the color and tonal range of a camera focussed on the reference image can be balanced to enable the camera to produce a faithful reproduction of objects in a light source having similar characteristics, having a screen with an opening;

means for supporting a reference image object in said opening; and a light diffuser panel for transmitting light from a source to the reference object;

the improvement:

wherein the reference object is supported by the means for supporting the reference object in parallel relation to the surface of the light diffuser panel and;

a specular reflector is mounted at the back of the screen to reflect light from a source to the diffuser panel's surface, the plane of said specular reflector being at an angle of about 45 degrees to the plane of the screen, whereby the length of the light path from the source to the diffuser panel's surface is about the same for the full depth of the diffuser panel's surface.

4. In a portable test pattern illuminator for illuminating a reference image so that the color and tonal channels of a camera focussed on the reference image can be balanced to enable the camera to produce a faithful reproduction of objects in a light source having similar characteristics, having a screen with an opening;

means for supporting a reference image object in said opening; and a light diffuser panel for transmitting light from a source to the reference object;

the improvement claimed in claim 3 and wherein said diffuser panel has a peripheral non-specular reflector extending around its perimeter; said peripheral non-specular reflector having a non-specular reflective surface of substantially neutral coloration to reflect non-specular diffused light onto the marginal areas of the diffuser panel to achieve a more even light distribution across the face of the diffuser panel in use.

* * * * *